United States Patent Office 3,600,315

Patented Aug. 17, 1971

3,600,315

METHODS OF MANUFACTURING MAGNETIC COMPOSITIONS OF CARBON MODIFIED CHROMIUM OXIDE

Robert S. Haines, Boulder, Colo., assignor to International Business Machines Corporation, Armonk, N.Y.

No Drawing. Filed Dec. 22, 1969, Ser. No. 887,412
Int. Cl. C01g 37/02
U.S. Cl. 252—62.51 4 Claims

ABSTRACT OF THE DISCLOSURE

This invention relates to the formation of ferromagnetic chromium oxide compositions containing 59% to 62% chromium and 0.05% to 0.90% carbon combined with oxygen, and in the form of finely divided particles of tetragonal crystalline structure. The process of forming carbon modified ferromagnetic chromium oxide consists of mixing a soluble chromium halide compound with an organic complexing agent, associating the complex with additional chromium compound, and then subjecting the mixture to heat and pressure decomposition.

BACKGROUND OF THE INVENTION

Field of the invention

This invention relates to magnetic compositions and to novel methods for preparing them in finely divided particle form. More particularly, it relates to ferromagnetic compositions of carbon modified chromium oxide having tetragonal crystalline structures, and to methods for their preparation in finely divided particle form. Such particles are suitable for use, for example, in magnetic recording media, magnetic cores, and the like.

Description of the prior art

In the prior art, various types of magnetic compositions have been prepared in numerous ways. Included in the prior art magnetic compositions are chromium oxides having ferromagnetic properties. These magnetic chromium oxides have been nominally designated as chromium dioxide and have long been reported in the chemical literature. Early methods of preparation of ferromagnetic chromium oxide have been by heating chromium tri-oxide in oxygen and by pyrolysis of gaseous chromyl chloride. More recently, methods of producing ferromagnetic chromium oxide, primarly from chromium tri-oxide under conditions of both heat and pressure, and in the presence of water, have been reported. Within the last two decades, heightened interest and activity in the preparation of ferromagnetic chromium oxide has resulted in a substantialtial number of publications being made and patents being issued in this technology. In some instances, the utilization of preferential substrates during the formation of chromium dioxide, for example, by gas pyrolysis has been reported. In other instances, one or more specific modifying ingredient or oxidizing agent has been included in the reaction mixture during heat and pressure treatment to yield a ferromagnetic chromium oxide which may or may not be modified with an additive ingredient. In yet another form of activity, multi-step processes of treating various chromium compounds, with or without modifying ingredients or oxidizing agents, have been utilized to produce forms of ferromagnetic chromium oxide.

It is both useful and desirable to provide alternative methods of preparing magnetic chromium oxides for use, for example, in the manufacture of magnetic recording media.

SUMMARY OF THE INVENTION

It is an object of the present invention to provide ferromagnetic chromium oxides by new and improved processes of forming a chromium halide complex, and associating the complex with additional chromium compound prior to thermal pressure decomposition.

A further object is to provide novel ferromagnetic chromium oxide materials, including carbon as a component.

It is another object of the present invention to provide carbon containing ferromagnetic chromium oxide which is useful in the manfacture of magnetic recording media.

Other objects will appear hereinafter.

The present invention provides new types of finely divided carbon modified ferromagnetic chromium oxide by intimately mixing an organic complexing agent with a chromium halide compound to form a complex, associating the complex with additional chromium compound, such as chromium tri-oxide, and then heating the mixture at a temperature between about 250° C. and 500° C. while subjecting the reaction mixture to superatmospheric pressure. The complexed chromium may be equivalent to about 0.1 to about 40%, by weight, of the additional chromium compound, although greater amounts may be used advantageously. Reaction pressures ranging from 50 to 3000 atmospheres are operable. Pressures of about 50 to 1000 atmospheres are preferred.

The organic complexing agent utilized in the present invention is characterized by low molecular weight, a tendency not to polymerize when heated, and an absence of easily reducible portions, such as amines. Included within this family of organic complexing agents are phthalic acid, benzoic acid, 8-hydroxy quinoline, tetrachlorophthalic acid, pryomellitic acid, trimellitic acid, the anhydrides of the foregoing compounds, and other low molecular weight organic compounds containing hydrogen, oxygen, and a halide.

Prior art references dealing with the complexing of chromium include the Journal of the Society of Leather Trades' Chemists at volume 32, pages 88–101; at volume 33, pages 92–100; at volume 34, pages 3–6 and pages 186–196; and the Journal of American Leather Chemists Association at volume 44, page 889, at volume 45, pages 41–51, and at volume 46, page 56.

The chromium halides operable in the present invention include not only the chlorides, bromides, iodides, and fluorides, but also include the perhalates, such as chromium perchlorate.

Intimate mixture and treatment of the chromium complex, once it is formed, may be obtained, if desired, prior to the addition of additional chromium compound in any suitable manner, such as by grinding or ball milling. After mixing of the complexed chromium compound and the additional chromium is completed, the combined reaction mixture is placed in a vessel in which it is both heated and subjected to superatmospheric pressure.

Carbon magnetic chromium oxide produced by the process of this invention, contains about 59–62% chromium and about 0.05 to about 0.90% carbon combined with oxygen, and is in the form of finely divided particles of uniform size. The particles display a rultile tetragonal crystalline structure, and are acicular, having a length-to-width ratio of as much as 14 to 1 and an actual length in the range of about 0.3 to 13 microns.

If desired, modifying agents other than organic complexing agents may be used in the process of this invention. Modifying agents, when employed, are used in amounts which are well defined in the prior art.

The foregoing and other objects, features, and advantages of the invention will be apparent from the following more particular description of the preferred embodiments of the invention.

DESCRIPTION OF THE PREFERRED EMBODIMENTS

In the following examples, the reactants were reagent grade chemicals; however, use of commercial grade chemicals is within the scope of this invention. Ferromagnetic particles produced by the method of the present invention were normally separated from the small amounts of unreacted and nonmagnetic constituents by washing, and then dried. Powder samples of the magnetic compositions produced by the present invention were measured with a vibrating sample magnetometer, VSM, at 4000 oersteds to determine their magnetic properties. Determination of the chemical content of the magnetic particles was obtained by both X-ray fluorescense spectroscopy and neutron activation. The chromium content was found to range from about 59 to 62%, by weight, with the balance carbon in the range of about 0.05 to 0.90%, by weight, and the balance oxygen. Crystal structure was determined by examination of X-ray diffraction patterns. Particle shape, size, and length-to-width ratios were determined from electron micrographs of the particles.

Example I.—Phthalic acid (3.0 g.) was added to 125 ml. of water and heated with stirring until the phthalic acid was completely dissolved and a clear solution obtained. To this solution, chromous chloride, $CrCl_2$, (1.1 g.) was added with stirring to form a pale blue complex. A second solution containing 8.0 g. of chromium trioxide, $CrO_3$, in 200 ml. of hot water was prepared simultaneously with the first solution. The complexed first solution and the second $CrO_3$ solution were joined and formed a translucent mixture. This solution was then evaporated in an open container to yield a dry, non-magnetic powder. A 2.3 g. portion of this dry powder was then dispersed in 100 ml. of water, with little dissolution noted, and ball milled for 36 hours. The ball-milled mixture was then added to another solution containing 6.0 g. of $CrO_3$ in 200 ml. of hot water and evaporated to a thick non-magnetic paste. The paste was placed in a Pyrex glass tube with a loose fitting glass stopper and the tube placed in an autoclave. The pressure vessel was then filled with liquid nitrogen to an initial pressure of 1200 p.s.i. (82 atm.), heated at 250° C. for 1 hour, and then further heated at 410° C. for an additional hour. During the heating cycles, the pressure in the vessel was brought up to 4000 p.s.i. (272 atm.). After the vessel was cooled, depressurized, and the tube removed from within, it was found to contain a black powder, which upon X-ray analysis was found to be more than 90% carbon modified chromium dioxide. The chromium dioxide was tested for magnetic properties by packing a portion in a glass cylinder for measurement by the VSM. The saturation magnetization per gram, or sigma value, was found to be 59.4 e.m.u./g., and the intrinsic coercivity of the material was found to be 484 oersteds. The particles were highly acicular and under a micron in size.

A 2.0 g. portion of the previously formed chromous chloride-phthalic acid complex-chromium trioxide mixture was ball milled for 36 hours in butanone (methylethyl ketone) and centrifuged to collect the finely divided powder precipitate. The powder was then added to a solution containing 6.0 g. of $CrO_3$ in 200 ml. of hot water, and the mixture evaporated to a thick non-magnetic paste. This paste was then placed in a glass tube, loosely closed with a glass top, placed in a pressure vessel, pressurized with liquid nitrogen to 1500 p.s.i. (102 atm.), and the vessel then heated to 250° C. for one hour, followed by additional heating for one hour at 410° C., at which time the pressure reached 4100 p.s.i. (279 atm.). The vessel was then cooled with water, the tube removed and found to contain carbon modified ferromagnetic chromium oxide powder, having a sigma value of 60 e.m.u./g. and an intrinsic coercivity of 143 oersteds.

Example II.—A complex of 3.0 g. of phthalic acid and 0.4 g. chromous chloride was prepared in 120 ml. of water as in Example I. The resulting complexed solution was then mixed with a second solution containing 8.0 g. of $CrO_3$ in 200 ml. of water and the mixture evaporated to dryness to yield a black, non-magnetic powder. A 2.4 g. portion of this powder was subsequently added to 100 ml. of water and ball milled for one hour. The ball milled mixture was then added to a 6.0 g. $CrO_3$ solution in 200 ml. of water and the mixture evaporated to a dry, non-magnetic powder. This powder was then placed in a loosely stoppered Pyrex tube, pressurized to 1000 p.s.i. (68 atm.), heated to 393° C., at which time the pressure reached 5500 p.s.i. (375 atm.), and cooled as in Example I. The resultant black, carbon ferromagnetic, chromium oxide powder found in the tube had a sigma value of 75.5 e.m.u./g., and a coercivity of 273 oersteds. The particles were found to be highly acicular and under 1 micron in length.

Example III.—A chromous chloride-phthalic acid complex containing 4.5 g. of the former and 6.0 g. of the latter was prepared in 300 ml. of water, as in the previous examples. This complex solution was then added to a solution containing 24.0 g. of $CrO_3$ in 400 ml. of water. The mixture was evaporated to dryness and the resulting non-magnetic brown powder was ball milled with water for 2 hours and divided into several 2.5 g. portions.

A 2.5 g. portion of the ball milled powder mixture was dissolved in a solution of 4.5 g. of $CrO_3$ in 200 ml. of water. The mixture was then evaporated to dryness and placed in a loosely closed Pyrex tube, the tube placed in a pressure vessel, the vessel pressurized to 4300 p.s.i. (292 atm.) and heated to 393° C., at which time the pressure reached 8000 p.s.i. (544 atm.), cooled and the glass tube removed therefrom. The resulting carbon modified ferromagnetic, black, chromium oxide powder within the tube was found to have a sigma value of 80 e.m.u./g. and a coercivity of 340 oersteds.

Another 2.5 g. portion of the ball milled powder mixture, prepared above, was added to a solution of 6.0 g. $CrO_3$ in 200 ml. of water, and the mixture evaporated to dryness. Then, 8,3 g. of this dry mixture was placed in a loosely stoppered Pyrex tube, the tube placed in an autoclave, the autoclave pressurized and heated as in the immediately preceding run, and cooled. The resulting black, ferromagnetic powder had a sigma value of 85.5 e.m.u./g. and a coercivity of 302.

A third 2.5 g. portion of the original ball milled mixture was dissolved in a 7.5 g. solution of $CrO_3$ in 200 ml. of water. The resulting mixture was then evaporated to dryness and subjected to thermal pressure decomposition of 393° C. and 12,000 p.s.i. (817 atm.) as taught in the previous examples. The carbon modified ferromagnetic chromium oxide powder thus produced had a sigma value of 86.3 e.m.u./g. and a coercivity of 450 oersteds.

Example IV.—A complex was formed of 1.5 g. $CrCl_3$, chromic chloride, and 4.5 g. phthalic acid in 150 ml. of water. This solution was then added to a solution containing 10.0 g. of $CrO_3$ dissolved in 250 ml. of hot water. The mixture was then evaporated to dryness in the form of a non-magnetic black powder and divided into several 2.5 g. portions.

Two separate 2.5 g. portions of the black powder prepared above were ball milled separately for two hours with 75 ml. of water. To one of the ball milled portions was added a solution of 4.5 g. $CrO_3$ in 200 ml. of water, and the mixture evaporated to a thick paste. The second 2.5 g. portion of black powder was mixed with 6.0 g. $CrO_3$ dissolved in 200 ml. of water and, also, evaporated to a thick paste. The first and second paste portions thus prepared were placed in separate loosely stoppered Pyrex tubes, the tubes placed in an autoclave, the autoclave pressurized to 1000 p.s.i. (68 atm.) and heated to 250° C. for 1 hour and then to 425° C. for another hour with a final pressure of 3500 p.s.i. The autoclave was then cooled and the Pyrex tubes removed. The first tube was found to contain carbon modified ferromagnetic chromium oxide having an intrinsic coercivity of 358 oersteds and a sigma value of 60 e.m.u./g. The second Pyrex tube was also found to contain carbon modified chromium oxide having a coercivity of 339 oersteds and a sigma value of 86.1 e.m.u./g.

Any chromium halide compound may be used in the process of the present invention, and the divalent and trivalent compounds are representative examples of compounds which are readily available and which are capable of use with good results.

While water is a convenient solvent for the initial step of mixing the chromium halide and organic complexing components of this process, other solvents, including organic liquids, can be used for the same purpose. Similarly, grinding at various stages may be by simple mortar and pestle, or by ball milling with water or other liquids in order to obtain the desired consistency in the reactants.

The thermal pressure reaction process may be carried out using either completely dry ingredients or in the presence of water or hydrated constituents. However, the presence of water during the reaction is not essential. The use of modifying ingredients is within the scope of this invention.

Uses for the materials produced in the foregoing examples are well known. For example, the ferromagnetic compositions produced by the examples may be mixed with non-magnetic, organic, film-forming binders and utilized to prepare magnetic recording media.

Typical, but not limiting, binders for use singularly or in combination for preparing various recording media, including ferromagnetic particles produced in accordance with this invention, are polyesters, cellulose esters and ethers, epoxides, vinyl chloride, vinyl acetate, acrylate and styrene polymers and copolymers, polyurethanes, polyamides, aromatic polycarbonates, and polyphenyl ethers.

A wide variety of solvents may be used for forming a dispersion of the fine ferromagnetic particles, produced in the foregoing examples, with various binders. Organic solvents, such as ethyl, butyl, and amyl acetate, isopropyl alcohol, dioxane, acetone, methylisobutyl ketone, cyclohexanone, and toluene are useful for this purposes. The particle-binder dispersion may be applied to a suitable substrate by roller coating, gravure coating, knife coating, extrusion, or spraying of the mixture onto the backing, or by other known methods.

In preparing recording media, the magnetic particles usually comprise about 40–90% by weight of the solids in the film layer applied to the substrate. The substrate is usually a flexible resin, such as polyester or cellulose acetate material, although other flexible materials as well as rigid base materials are more suitable for some uses.

The specific choice of non-magnetic substrate binder, solvent or method of application of the magnetic composition to the support will vary with the properties desired and the specific form of the magnetic recording medium being produced.

In preparing magnetic cores and permanent magnets, the products of the examples are mixed with non-magnetic plastic or filler in an amount of about 33–50% by volume of the magnetic material; the particles aligned in a magnetic field; and the mixture pressed into a firm magnet structure. Alignment of the particles may be accomplished in an externally applied DC magnetic field of about 4000 gauss, or more. Pressures may vary widely in forming the magnet. Pressures up to 100,000 p.s.i. and fields of 28,000 gauss have been used commercially.

While the invention has been particularly shown and described with reference to preferred embodiments thereof, it will be understood by those skilled in the art that various changes in form and details may be made therein without departing from the spirit and scope of the invention.

What is claimed is:

1. A process for producing ferromagnetic carbon modified chromium oxide composition of tetragonal crystal structure containing about 59% to 62%, by weight, of chromium and about 0.05% to 0.90%, by weight, of carbon and with the balance oxygen, which comprises:
   - forming a complex by mixing a soluble chromium halide compound with at least one organic complexing agent selected from the group consisting of phthalic acid, benzoic acid, 8-hydroxy quinoline, tetrachlorphthalic acid, pyromellitic acid, trimellitic acid and the anhydrides of the foregoing compounds;
   - mixing the complex thus formed with chromium trioxide; and then
   - heating the mixture at a temperature within the range of about 250° C. to 500° C. and under a pressure of at least 50 atmospheres.

2. The process of claim 1 in which the organic complexing agent is phthalic acid.

3. The process of claim 1 in which the mixture is heated under a pressure within the range of about 50 to 3000 atmospheres.

4. The process of claim 3 in which the mixture is heated under a pressure within the range of about 50 to 1000 atmospheres.

References Cited

UNITED STATES PATENTS

| | | | |
|---|---|---|---|
| 3,034,988 | 5/1962 | Ingraham et al. | 252—62.51 |
| 3,078,147 | 2/1963 | Cox | 252—62.51X |
| 3,117,093 | 1/1964 | Arthur et al. | 252—62.51 |
| 3,371,043 | 2/1968 | Hund et al. | 252—62.51 |
| 3,512,930 | 5/1970 | Bottjer et al. | 252—62.51X |

TOBIAS E. LEVOW, Primary Examiner

J. COOPER, Assistant Examiner

U.S. Cl. X.R.

23—145